UNITED STATES PATENT OFFICE.

HENRY SPENCER BLACKMORE, OF MOUNT VERNON, NEW YORK.

PROCESS OF LIBERATING AND SEPARATING FIBERS.

No. 803,391. Specification of Letters Patent. Patented Oct. 31, 1905.

Application filed February 2, 1905. Serial No. 243,908.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Liberating and Separating Fibers; and I do hereby declare the following to be a full, clear, and exact description of the invention, such as will enable others skilled in the art to which it appertains to make and use the same.

The object of my invention is to liberate and separate fibers from their naturally uniting or binding constituents with which they are found in nature—such as cutose, vasculose, &c.—in such a manner that the fibers are not injured and that the gummy or binding constituents are removed by simple and economical means.

My invention particularly relates to the separation of ramie fiber, but is not limited thereto, as many other fibers may be liberated or separated by my process, such as jute, New Zealand flax, &c.

It is well known that the substances which bind fibers of ramie and similar vegetation consist largely of complex acid substitution products combined more or less with calcium, forming ordinarily insoluble compounds, such as the calcium salts of oleocutic, stereocutic, pectic, and similar organic acids.

My invention therefore consists in transforming the insoluble ingredients of the fibers into soluble compounds without affecting or injuring the fiber and separating the individual fibers from each other by the increase in bulk of chemicals introduced between the fibers induced by decomposition or combination.

In carrying out my process I prefer to proceed as follows: I take the stalk, such as ramie, from which it is desired to separate the fiber and place the same in a receptacle containing a ten-per-cent. solution of alkali aluminate, such as sodium aluminate, preferably in a heated state, (about 200° Fahrenheit.) The receptacle is then closed and the stalks allowed to digest for about an hour, when the pressure is preferably reduced by exhaustion, which withdraws from the stalks any occluded air within the pores between the fibers.

I prefer to treat the fibrous material in drums holding about two hundred and fifty gallons of ten-per-cent. solution of sodium aluminate and add thereto from time to time fresh portions of alkali aluminate to compensate for that taken up by the decomposition of the binding constituents of the fiber, so that the solution may be maintained at about a uniform density. I then subject the material to an increased pressure of steam to about sixty pounds, which further heats the solution and drives it into the material, thus thoroughly saturating it with alkali aluminate. During the digestion under pressure the alkali aluminate and binding calcium salts are decomposed, producing alkali oleocutate, stereocutate, pectate, &c., and calcium aluminate. The stalks containing the alkali aluminate are then removed from the chemical bath and thoroughly washed, and are then subjected in their moist condition to the action of ammonia-gas under pressure of about one hundred pounds, which is absorbed by the moisture within the pores between the fibers with great avidity. After subjecting the fibers to the action of ammonia-gas for about thirty minutes the supply of ammonia-gas is cut off and carbon dioxid or carbonic anhydrid is introduced under a pressure of about three hundred pounds, which immediately combines with the ammonium hydroxid formerly produced within the pores between the fibers, thereby forming ammonium carbonate, bicarbonate, and carbamate, thereby increasing the bulk of chemical salts to such a degree within the pores that the fibers are readily separated from each other and the alkali neutralized by combination with the carbonic acid. The reaction which takes place may be illustrated by the following chemical formula or equation:

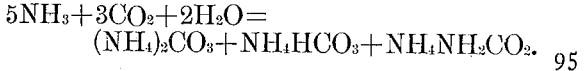

$$5NH_3 + 3CO_2 + 2H_2O = (NH_4)_2CO_3 + NH_4HCO_3 + NH_4NH_2CO_2.$$

The pressure is then reduced, the stalks removed and thoroughly washed with water, the ammonium salts being thereby removed, leaving the fibers clean and practically free from each other, and which after drying and bleaching are in condition for mechanical treatment and manufacture into textile articles.

It can be seen from the foregoing description that my process consists in transforming the binding substances of the fibers into soluble compounds without injuring the fiber and parting the individual fibers by the formation of ammonium salts within the pores between the fibers, the increase of bulk in formation of which separates the individual fibers from each other, and the ammonium salts thus produced within the pores between the fibers may be readily dissolved out by the action of warm water, leaving the fibers practically free from each other. The ammonia for bleaching operations may be recovered from these washings by the action of calcium hydroxid or other means well known to chemists.

It is obvious that other combining agents may be employed in conjunction with ammonia to produce compounds of increased bulk within the pores between the fibers whereby the segregation of the fibers is accomplished, such as sulfur dioxid, (sulfurous anhydrid,) whereby ammonium sulfite would be produced instead of carbonate, bicarbonate, and carbamate, as in the case heretofore mentioned, the principal object of this specific invention being that the ammonia, being of searching character and being absorbed with avidity by the moisture within the pores between the fibers, facilitates the saturation within the pores to such a degree that when exposed to the action of a combining agent to increase the bulk thereof the result of the segregation of the fibers is accomplished in shorter time and with greater ease without contaminating the separated fiber with insoluble substances than is the case when solutions of solids are employed, it being noted that in this specific application the moistened fibers are exposed under pressure to the action of gases of alkali and acid nature, which gases are alternately absorbed or taken up by the moisture within the pores between the fibers and in the presence of which combine with each other, increasing in bulk and forming solids, simultaneously absorbing the moisture present as water of hydration.

Having now described my invention, what I claim as new, and desire to secure by Letters Patent, is—

1. The process of liberating and separating fibers which consists in transforming the binding constituents of fibers into soluble compounds by the action of chemical agents and finally separating the fibers from each other by exposing the moist fibers to the alternate action of fluid bodies of alkaline and acid nature whereby the fibers are segregated by the combination of the alkaline with the acid fluids within the pores between the fibers.

2. The process of liberating and separating fibers which consists in transforming the binding constituents of fibers into soluble compounds by the action of chemical agents and finally separating the fibers from each other by subjecting the moist fibers to the action of gaseous ammonia and a gaseous-acid anhydrid whereby the fibers are segregated by the combination of the ammonia with the acid andydrid in the presence of the moisture.

3. The process of liberating and separating fibers which consists in transforming the binding constituents of fibers into soluble compounds by the action of chemical agents and finally separating the fibers from each other by subjecting the moist fibers to the action of ammonia and carbon dioxid whereby the fibers are segregated by the combination of the ammonia with the carbon dioxid in the presence of the moisture.

4. The process of liberating and separating fibers which consists in transforming the binding constituents of fibers into soluble compounds and exposing the moist stalks to the action of ammonia under pressure and finally separating the fibers from each other by exposing the moist ammoniated fibers to the action of carbon dioxid under pressure whereby the fibers are separated from each other by the formation of ammonium salts within the pores between the fibers and finally dissolving out the ammonium carbonate, bicarbonate, and carbamate thus produced, substantially as described.

In testimony whereof I affix my signature in presence of two witnesses.

HENRY SPENCER BLACKMORE.

Witnesses:
H. N. JENKINS,
C. C. WRIGHT.